United States Patent
Fukui (10) Patent No.: US 7,616,230 B2
(45) Date of Patent: Nov. 10, 2009

(54) IMAGE SENSING APPARATUS, PRINTING APPARATUS, AND DIRECT PRINTING SYSTEM HAVING THEM

(75) Inventor: Takaaki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 11/169,624

(22) Filed: Jun. 30, 2005

(65) Prior Publication Data

US 2006/0002726 A1    Jan. 5, 2006

(30) Foreign Application Priority Data

Jun. 30, 2004  (JP)  ............................. 2004-194293
Jun. 28, 2005  (JP)  ............................. 2005-187845

(51) Int. Cl.
*H04N 5/225* (2006.01)

(52) U.S. Cl. ................................. 348/207.2

(58) Field of Classification Search ............... 348/207.2
See application file for complete search history.

(56) References Cited

U.S. PATENT DOCUMENTS 6,115,137 A * 9/2000 Ozawa et al. ................ 358/1.6
6,552,743 B1 * 4/2003 Rissman ................... 348/207.2
2001/0030692 A1 * 10/2001 Yoneda ....................... 348/207
2003/0222985 A1 * 12/2003 Goto et al. ............... 348/207.2
2005/0024498 A1 * 2/2005 Iida et al. ................ 348/207.2

FOREIGN PATENT DOCUMENTS

| JP | 2001275066 A | * | 10/2001 |
| JP | 2004-15234 | | 1/2005 |
| WO | WO 03/103285 A1 | | 12/2003 |

* cited by examiner

*Primary Examiner*—Timothy J Henn
*Assistant Examiner*—Usman Khan
(74) *Attorney, Agent, or Firm*—Fitzpatrick, Cella, Harper & Scinto (57) ABSTRACT

It is conventionally difficult to select which of an image sensing apparatus and printer executes image correction processing in direct printing of printing by directly connecting the image sensing apparatus and printer. To solve this problem, a processing site at which processing considered to obtain a more preferable output result can be executed is determined from information on image correction processes executable by the image sensing apparatus and printer. For example, the versions of software modules which execute image correction processing are compared, and processing is done by either the image sensing apparatus or printer that has a module of a newer version. An appropriate apparatus can be selected to execute image correction processing.

11 Claims, 10 Drawing Sheets

EXAMPLE OF COMMUNICATION COMMAND REPRESENTING
CONTENTS OF IMAGE CORRECTION BY PRINTING APPARATUS

EXAMPLE OF CORRECTION COMMAND

| COMMAND | PROCESSING CONTENT | FIRST ARGUMENT | SECOND ARGUMENT | VERSION | PROCESSING TIME | IMAGE PROCESSING LSI |
|---|---|---|---|---|---|---|
| Img Crct | 3D Lut | 9Step | 9Slice | Ver.6.0.1 | 30 | Hard Ware |
| Img Crct | WB | +-3Step | RGB | Ver.6.0.1 | 05 | Hard Ware |
| Img Crct | Cont | +-3Step | 0 | Ver.6.0.1 | 20 | Hard Ware |
| Img Crct | Exposure | +-2ev | 1/3ev | Ver.2.0.0 | 40 | Soft Ware |
| Img Crct | Skin Correct | +-3Step | 0 | Ver.10.0.0 | 05 | Hard Ware |

IMAGE SENSING APPARATUS, PRINTING APPARATUS, AND DIRECT PRINTING SYSTEM HAVING THEM

FIELD OF THE INVENTION

The present invention relates to an image sensing apparatus and printer which comply with direct printing of directly printing from an image sensing apparatus (e.g., digital camera) having an image sensor to a printing apparatus (e.g., printer) and, more particularly, to an image sensing apparatus and printing apparatus which can designate execution of image processing in printing.

The present invention relates to an image-supplying apparatus capable of directly sending image data stored in a storage device to an image processing apparatus, and an image processing apparatus capable of processing image data received from the image-supplying apparatus in accordance with an image processing instruction from the image-supplying apparatus.

BACKGROUND OF THE INVENTION

There has conventionally been known a technique of directly printing by a printer an image sensed by an image sensing apparatus such as a digital camera without the mediacy of any apparatus such as a computer (see, e.g., Japanese Patent Laid-Open No. 2004-15234). More specifically, two forms are generally known: one is direct printing of directly connecting an image sensing apparatus and printer by a communication cable and printing out, and the other is card direct printing of removing from an image sensing apparatus a memory card on which image sensing data is recorded, inserting the memory card into the memory card slot of a printer, and printing out.

When an image by the digital camera is to be printed out in these forms, the brightness, contrast, and the like can also be corrected. In card direct printing, the user can designate desired image correction by operating, e.g., a user interface displayed on the display of the printer with keys, buttons, and the like. In direct printing, the user can designate correction by operating the user interface of the image sensing apparatus and switching the On/Off state of automatic image correction processing of the printer.

Conventionally, settings on execution of image correction processing are made by operating the user interface of the image sensing apparatus or printer and setting the image correction processing function of the printer.

There is also proposed a method of performing image correction by the image sensing apparatus and outputting the corrected image data to the printer. In this case, desired correction processing can be done even when the printer does not have any image correction function or the user wants to perform image correction which cannot be processed by the image correction function of the printer.

Figure 3:
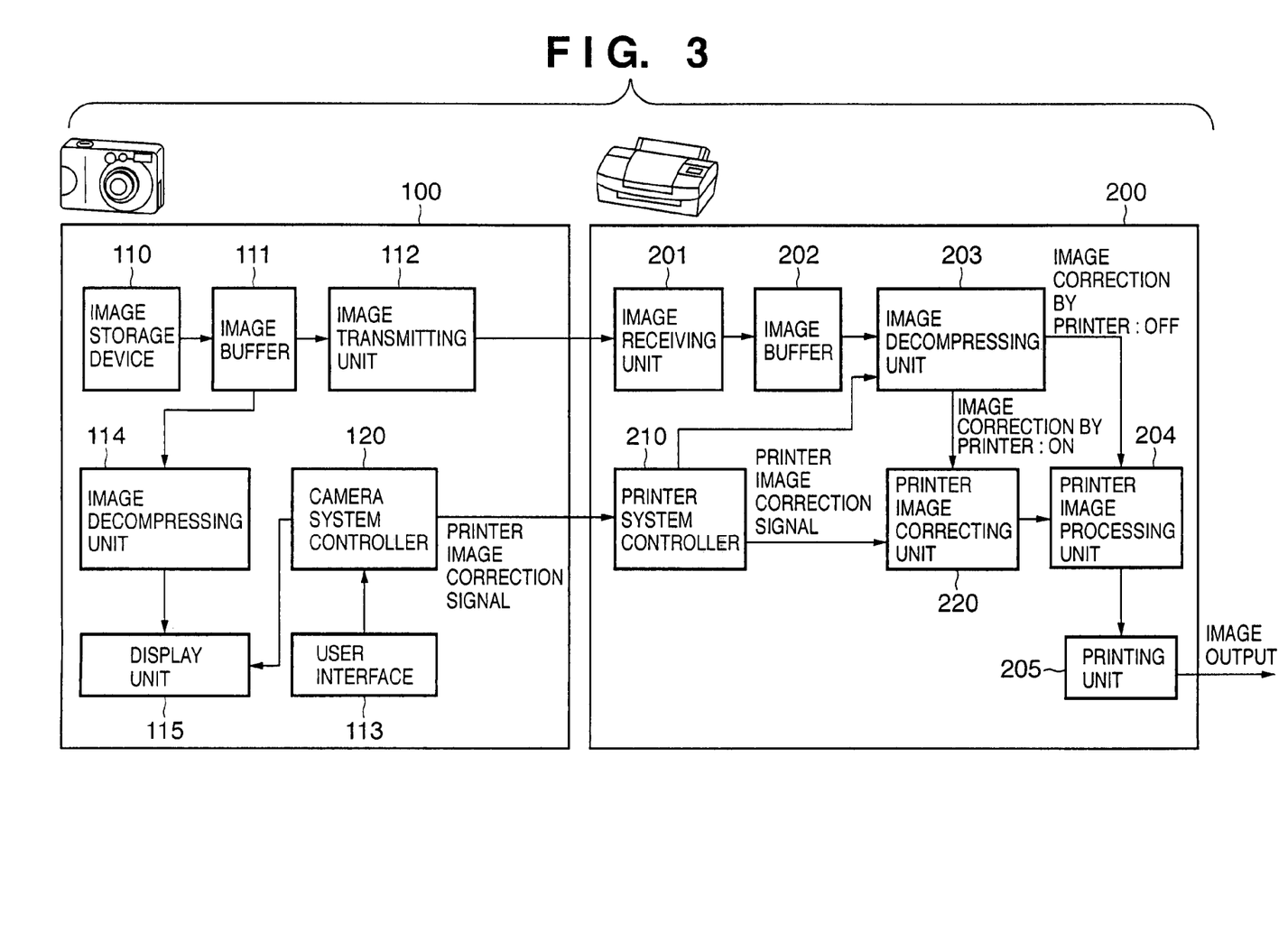
FIG. 3 is a block diagram showing an example of the arrangements of an image sensing apparatus and printer which constitute a conventional direct printing system.

FIG. 3 shows an example of the configuration of a system which performs print processing complying with a standard called PictBridge defined by Camera & Imaging Products Association as a standard form of direct printing.

A direct printing system in FIG. 3 is configured by connecting an image sensing apparatus 100 and printer 200.

In the image sensing apparatus 100, image data read out from an image storage device 110 which is, e.g., a memory card is stored in an image buffer 111. Since the stored image is generally compressed and encoded by a compression method called JPEG, the image is decompressed (decoded) by an image decompressing unit 114 and then displayed on a display unit 115. When the user designates printing of an image displayed on the display unit 115 via a user interface 113 made up of keys and buttons, an image transmitting unit 112 reads out the designated image from the image buffer 111 and transmits the image to the printer 200.

When execution of automatic image correction processing for a print-designated image is set in a series of operations accompanied with print designation or by preset settings, a camera system controller 120 of the image sensing apparatus 100 transmits to a printer system controller 210 of the printer 200 a signal (printer image correction signal) which validates the automatic image correction function of the printer.

Image data transmitted from the image transmitting unit 112 is received by an image receiving unit 201 and stored in an image buffer 202 both of the printer 200. Since the stored image data has been compressed and encoded, it is decompressed (decoded) by an image decompressing unit 203. If the automatic image correction signal is valid (has been received), the image undergoes image correction processing by a printer image correcting unit 220; if the automatic image correction signal is invalid (has not been received), the image is input to a printer image processing unit 204. The printer image processing unit 204 executes conversion (e.g., color space conversion) of the image data into data suitable for printing, and outputs the converted data to a printing unit 205. The printing unit 205 then prints out the image.

Figure 9:
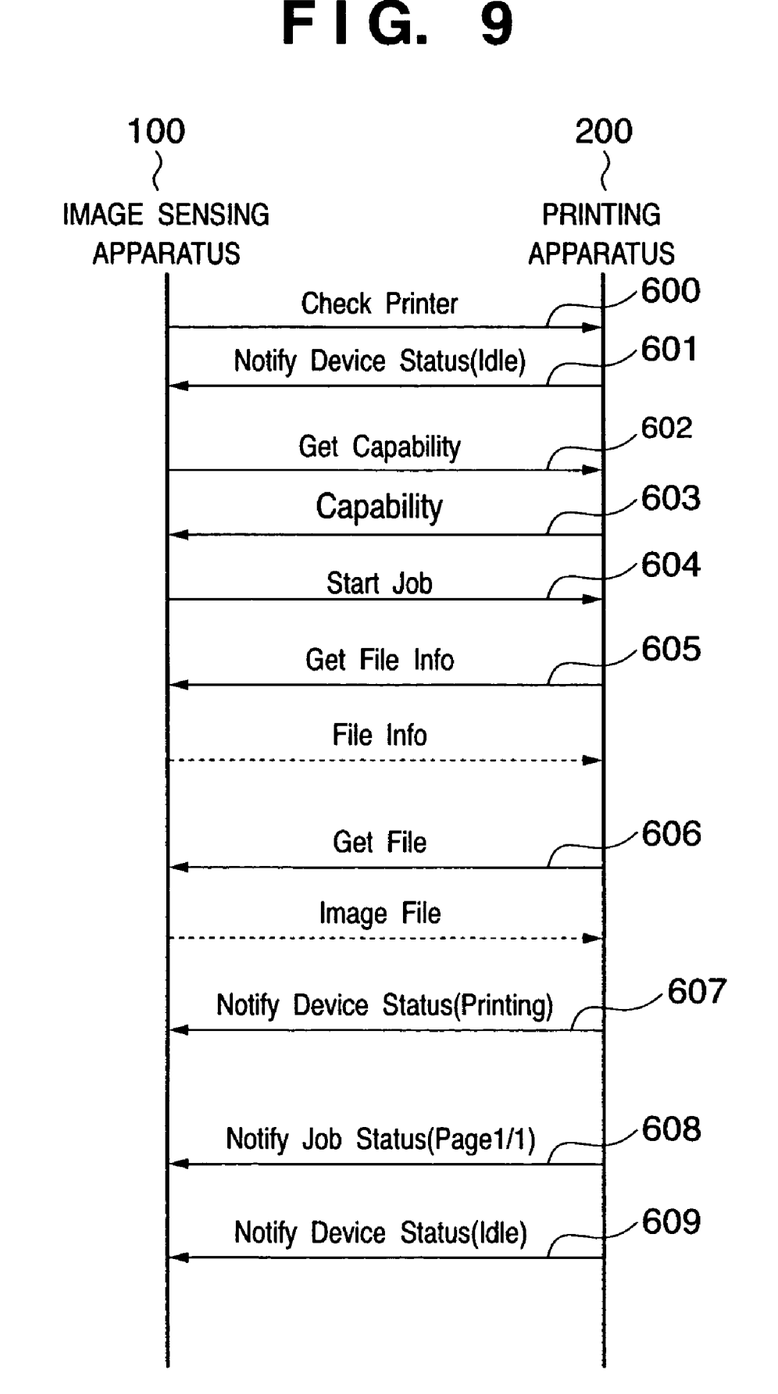
FIG. 9 is a chart schematically showing communication commands in a direct printing system.

FIG. 9 is a chart for explaining an example of a schematic signal flow when the image sensing apparatus 100 issues a print request to the printing apparatus 200 to print.

This processing sequence is executed after the image sensing apparatus 100 and printing apparatus 200 are connected via a cable, or after they communicate with each other by radio to confirm whether they comply with a predetermined communication method for printing. The image sensing apparatus 100 checks the status of the printing apparatus 200 (600). In response to this, the printing apparatus 200 notifies the image sensing apparatus 100 of the current status (in this case, "idle" status) of the printing apparatus 200 (601). Because of the "idle" status, the image sensing apparatus 100 inquires the capability of the printing apparatus 200 (602), and receives information such as print settings which can be dealt with by the printer (603). The image sensing apparatus 100 issues a print start request (Start Job) corresponding to the capability (604).

In response to the print start request, the printing apparatus 200 requests information (file attribute information such as the file size) on a file to be printed, of the image sensing apparatus 100 on the basis of the file ID of image data to be printed (Get File Info) (605). In response to this, the image sensing apparatus 100 transmits the file information (File Info). If the printing apparatus 200 determines that it can receive and process the file information, it requests the file information of the image sensing apparatus 100 (606). Image data (Image File) of the requested file is sent from the image sensing apparatus 100 to the printing apparatus 200. The printing apparatus 200 starts print processing, and sends status information representing "during printing (Printing)" 607 to the image sensing apparatus 100 by "Notify Device Status". After one page is printed, the printing apparatus 200 notifies the image sensing apparatus 100 of the end of printing by "Notify Job Status" 608 at the start of processing the next page. If printing targets only one page, the printing apparatus 200 notifies the image sensing apparatus 100 that the printing apparatus 200 changes to the "idle" status by "Notify Device Status" 609 upon printing one print-requested page (Notify Device Status (Idle)).

However, according to the method of performing image correction processing by the printer, as shown in FIG. 3, an image cannot be corrected when the printer does not have any image correction processing function.

Even if the printer has a desired image correction function, it is cumbersome to confirm the correction result by the user. Image data after correction processing must be sent back from the printer to the image sensing apparatus and displayed on the display unit 115. Alternatively, the image sensing apparatus must execute processing equivalent to image correction processing performed by the printer, and display the resultant image data on the display unit 115.

To perform image correction processing by the image sensing apparatus, sensed image data which has been compressed and encoded must be decompressed, undergo image processing, then be compressed again, and be transmitted to the printer. Re-compression degrades the image because the compression encoding method generally adopted in the image sensing apparatus is a lossy encoding method. When the image sensing apparatus does not have any image correction processing function, it cannot perform image correction processing.

Even when both the image sensing apparatus and printer can execute the same image correction processing, their processing qualities and functions are not always the same. It cannot be simply determined which of the image sensing apparatus and printer can achieve correction processing at a higher print quality.

As described above, when both the image sensing apparatus and printer can perform image correction processing in correction processing for printing out a sensed image, which of them is to execute the processing cannot be simply determined. Conventionally, there is no proposed mechanism of making an optimal decision. For this reason, the user prints out the same image by changing a processing site, changes settings in accordance with the result, and sets to perform image correction processing at a fixed site.

SUMMARY OF THE INVENTION

The present invention has been made to overcome the conventional drawbacks, and has as its object to determine an optimal execution site of image correction processing without any user's consciousness when image correction processing is performed in direct printing.

According to an aspect of the present invention, there is provided an image sensing apparatus configured to directly instruct a printing apparatus to print image data stored in storage means, characterized by comprising: image processing means, configured to execute predetermined image processing for the image data; information acquiring means for acquiring information on a capability of image processing executable by the connected printing apparatus; and determining means for, when execution of image processing is set for image data to be printed, determining which of the image sensing apparatus and the printing apparatus performs the set image processing, on the basis of information representing a capability of the image processing means and information on the capability of the image processing executable by the printing apparatus.

According to another aspect of the present invention, there is provided A printing apparatus configured to print out image data received from an image sensing apparatus in accordance with a print instruction from the image sensing apparatus, characterized by comprising: image processing means, configured to execute predetermined image processing for the received image data; and information transmitting means for transmitting, to the image sensing apparatus, information on a capability of the image processing executable by the image processing means in response to a request from the image sensing apparatus.

According to a further aspect of the present invention, there is provided An image sensing apparatus configured to directly instruct a printing apparatus to print image data stored in storage means, characterized by comprising: image processing means, configured to execute predetermined image processing for the image data; display means for displaying a first setting dialog for prompting a user to set execution of image processing using the image processing means; information acquiring means for acquiring information on a capability of image processing executable by the connected printing apparatus; determining means for, when the setting dialog of image processing for image data to be printed is displayed, determining whether the image processing executable by the printing apparatus is settable using the first setting dialog; setting dialog information acquiring means for, when the printing apparatus is configured to execute image processing which is unsettable using the first setting dialog, acquiring, from the printing apparatus, information for displaying a second setting dialog configured to set the image processing; and display means for displaying the first setting dialog or the second setting dialog.

According to a further aspect of the present invention, there is provided a printing apparatus configured to print out image data received from an image sensing apparatus in accordance with a print instruction from the image sensing apparatus, characterized by comprising: image processing means, configured to execute predetermined image processing for the received image data; and information transmitting means for transmitting, to the image sensing apparatus in response to a request from the image sensing apparatus, information for displaying a setting dialog for setting image processing executable by the image processing means.

According to a further aspect of the present invention, there is provided A method of controlling an image sensing apparatus which has image processing means configured to execute predetermined image processing for image data stored in storage means and which is configured to directly instruct a printing apparatus to print the image data, characterized by comprising: an information acquiring step of acquiring information on a capability of image processing executable by a method of controlling the connected printing apparatus; and a determining step of, when execution of image processing is set for image data to be printed, determining which of the image sensing apparatus control method and the printing apparatus control method performs the set image processing, on the basis of information representing a capability of the image processing step and information on the capability of the image processing executable by the printing apparatus control method.

According to a further aspect of the present invention, there is provided a method of controlling a printing apparatus which has image processing means configured to execute predetermined image processing for image data and which is configured to print out image data received from an image sensing apparatus, characterized by comprising: an information transmitting step of transmitting, to the image sensing apparatus, information on a capability of the image processing executable by the image processing means in response to a request from the image sensing apparatus.

According to a further aspect of the present invention, there is provided a method of controlling an image sensing apparatus which has image processing means configured to execute predetermined image processing for image data stored in storage means and which is configured to directly instruct a printing apparatus to print the image data, characterized by comprising: a display step of displaying a first setting dialog for prompting a user to set execution of image processing using the image processing means; an information acquiring step of acquiring information on a capability of image processing executable by the connected printing apparatus; a determining step of, when the setting dialog of image processing for image data to be printed is displayed, determining whether the image processing executable by the printing apparatus is settable using the first setting dialog; a setting dialog information acquiring step of, when the printing apparatus is configured to execute image processing which is unsettable using the first setting dialog, acquiring, from the printing apparatus, information for displaying a second setting dialog configured to set the image processing; and a display step of displaying the first setting dialog or the second setting dialog.

According to a further aspect of the present invention, there is provided a method of controlling a printing apparatus which has image processing means configured to execute predetermined image processing for image data and which is configured to print out image data received from an image sensing apparatus, characterized by comprising: an information transmitting step of transmitting, to the image sensing apparatus in response to a request from the image sensing apparatus, information for displaying a setting dialog for setting image processing executable by the image processing means.

According to a further aspect of the present invention, there is provided an image-supplying apparatus configured to directly send image data stored in storage means to an image processing apparatus, characterized by comprising: image processing means, configured to execute predetermined image processing for the image data; information acquiring means for acquiring information on a capability of image processing executable by the image processing apparatus and information of a setting dialog for setting the image processing executable by the image processing apparatus; and display control means for displaying a setting dialog for setting a content of the image processing by using the information of the setting dialog that is acquired by the information acquiring means.

According to a further aspect of the present invention, there is provided 18. The apparatus according to claim 17, characterized by further comprising determining means for determining, in accordance with the set content of the image processing, which of the image-supplying apparatus and the image processing apparatus performs the set image processing.

According to a further aspect of the present invention, there is provided an image processing apparatus configured to process image data received from an image-supplying apparatus in accordance with an image processing instruction from the image-supplying apparatus, characterized by comprising: image processing means, configured to execute predetermined image processing for the received image data; and transmitting means for transmitting, to the image-supplying apparatus, information on a capability of image processing executable by the image processing means and information for displaying a setting dialog for setting the image processing executable by the image processing means.

According to a further aspect of the present invention, there is provided a method of controlling an image-supplying apparatus which has image processing means configured to execute predetermined image processing for image data stored in storage means and which is configured to directly send image data to an image processing apparatus, characterized by comprising: an information acquiring step of acquiring information on a capability of image processing executable by the image processing apparatus and information of a setting dialog for setting the image processing executable by the image processing apparatus; and a display control step of displaying a setting dialog for setting a content of the image processing to be performed for the image data by using the information of the setting dialog that is acquired in the information acquiring step.

According to a further aspect of the present invention, there is provided a method of controlling an image processing apparatus which has image processing means configured to execute predetermined image processing for image data and which is configured to process image data received from an image-supplying apparatus in accordance with an image processing instruction from the image-supplying apparatus, characterized by comprising: a transmitting step of transmitting, to the image-supplying apparatus, information on a capability of image processing executable by the image processing means and information for displaying a setting dialog for setting the image processing executable by the image processing means.

With this arrangement, the present invention can obtain an effect of determining an optimal execution site of image correction processing without any user's consciousness when image correction processing is performed in direct printing.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 2:
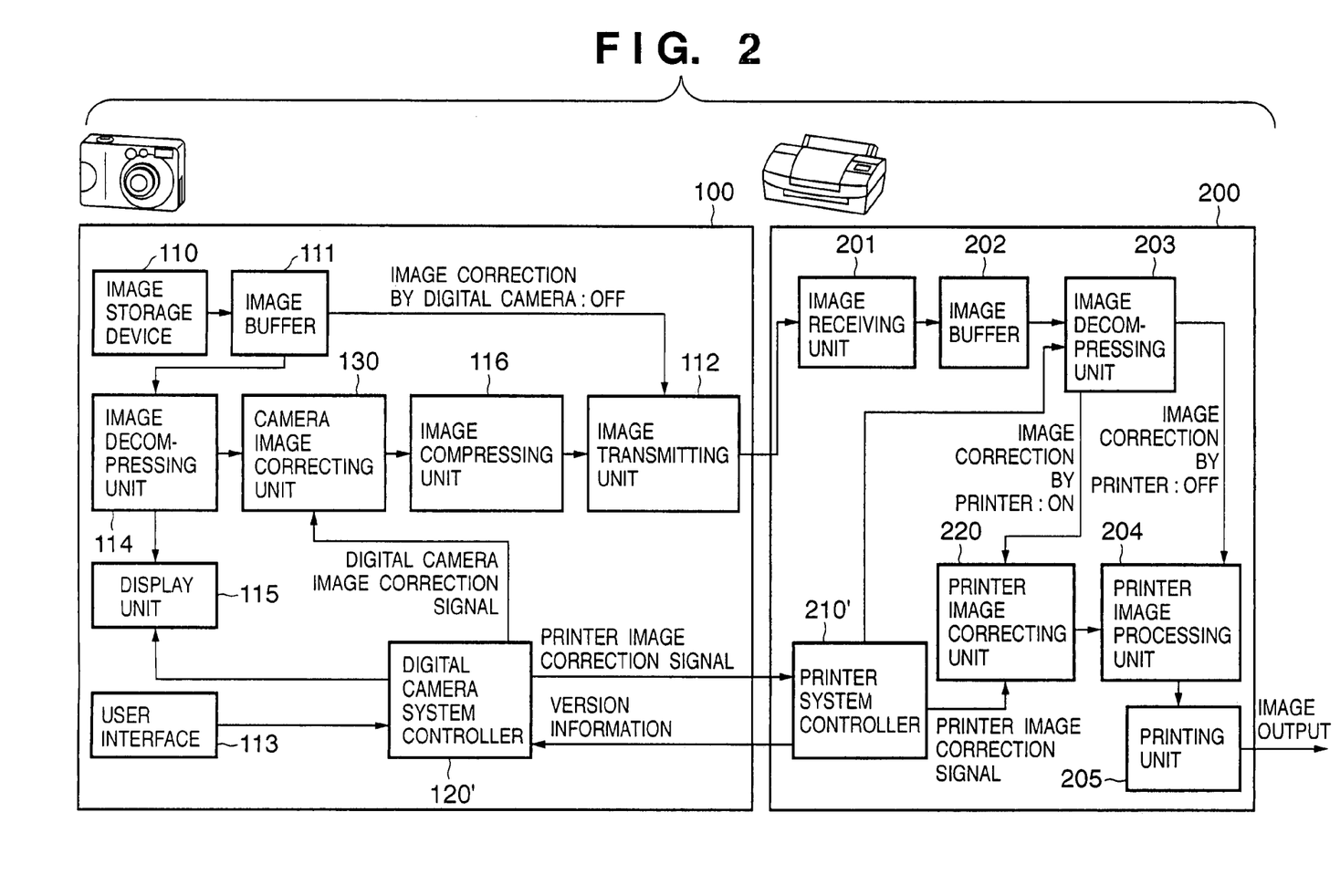
FIG. 2 is a block diagram showing an example of the schematic arrangements of the image sensing apparatus and a printer according to the first embodiment of the present invention.

FIG. 2 is a block diagram showing the schematic arrangements of an image sensing apparatus and printer according to the first embodiment of the present invention. The basic arrangement is the same as that in FIG. 3, and the same reference numerals denote the same parts. As is apparent from a comparison between FIGS. 2 and 3, the first embodiment is different from the prior art in that the image sensing apparatus is newly equipped with an image correcting unit 130 and image compressing unit 116, and also in operations of a camera system controller 120' and printer system controller 210'.

Figure 4:
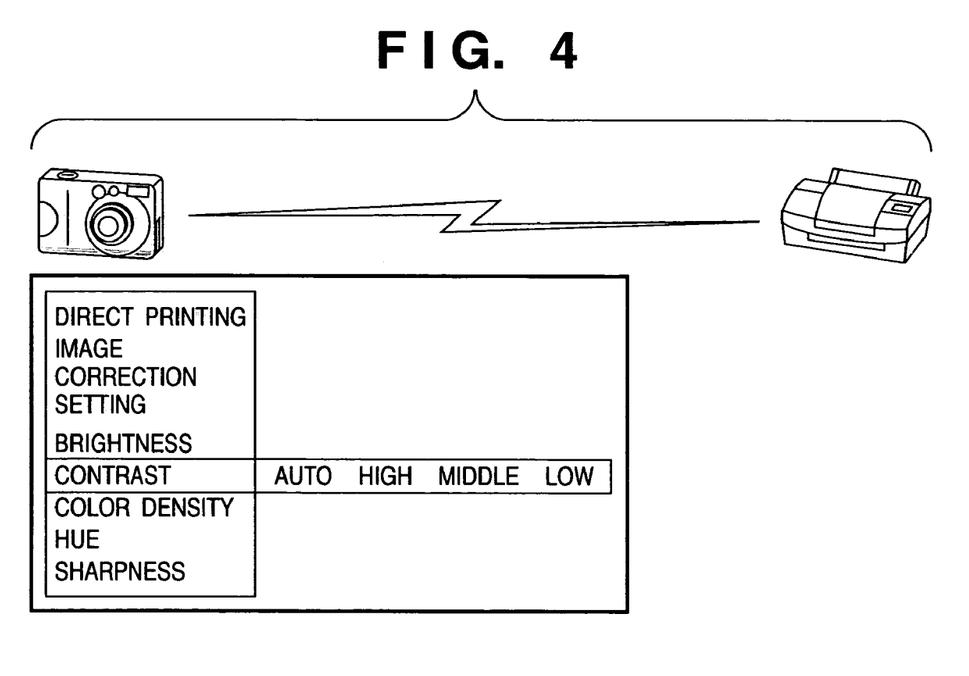
FIG. 4 is a view showing an example of an image correction setting dialog according to the first embodiment of the present invention.
Figure 6:
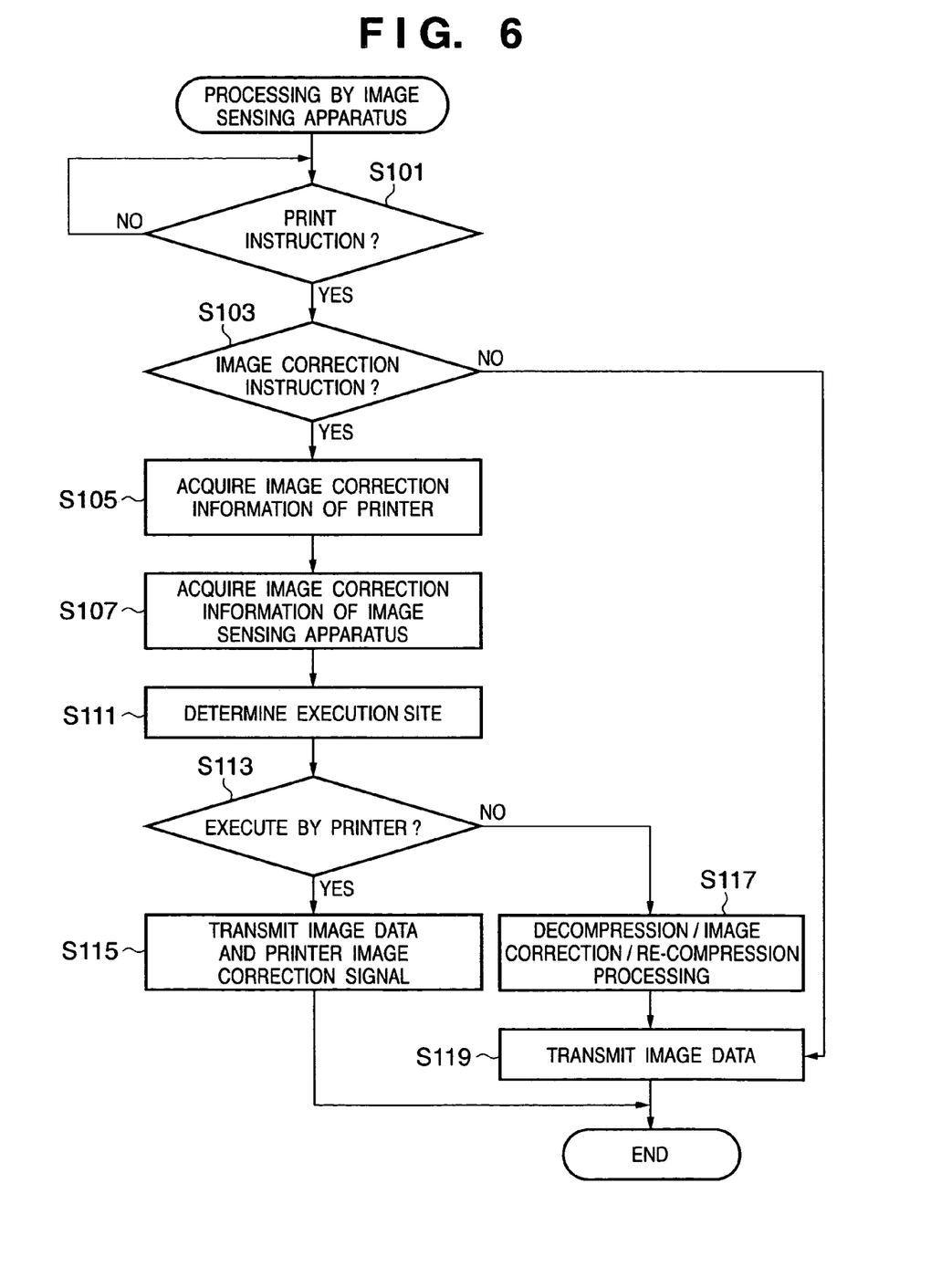
FIG. 6 is a flowchart for explaining operation of the image sensing apparatus according to the first embodiment of the present invention.
Figure 7:
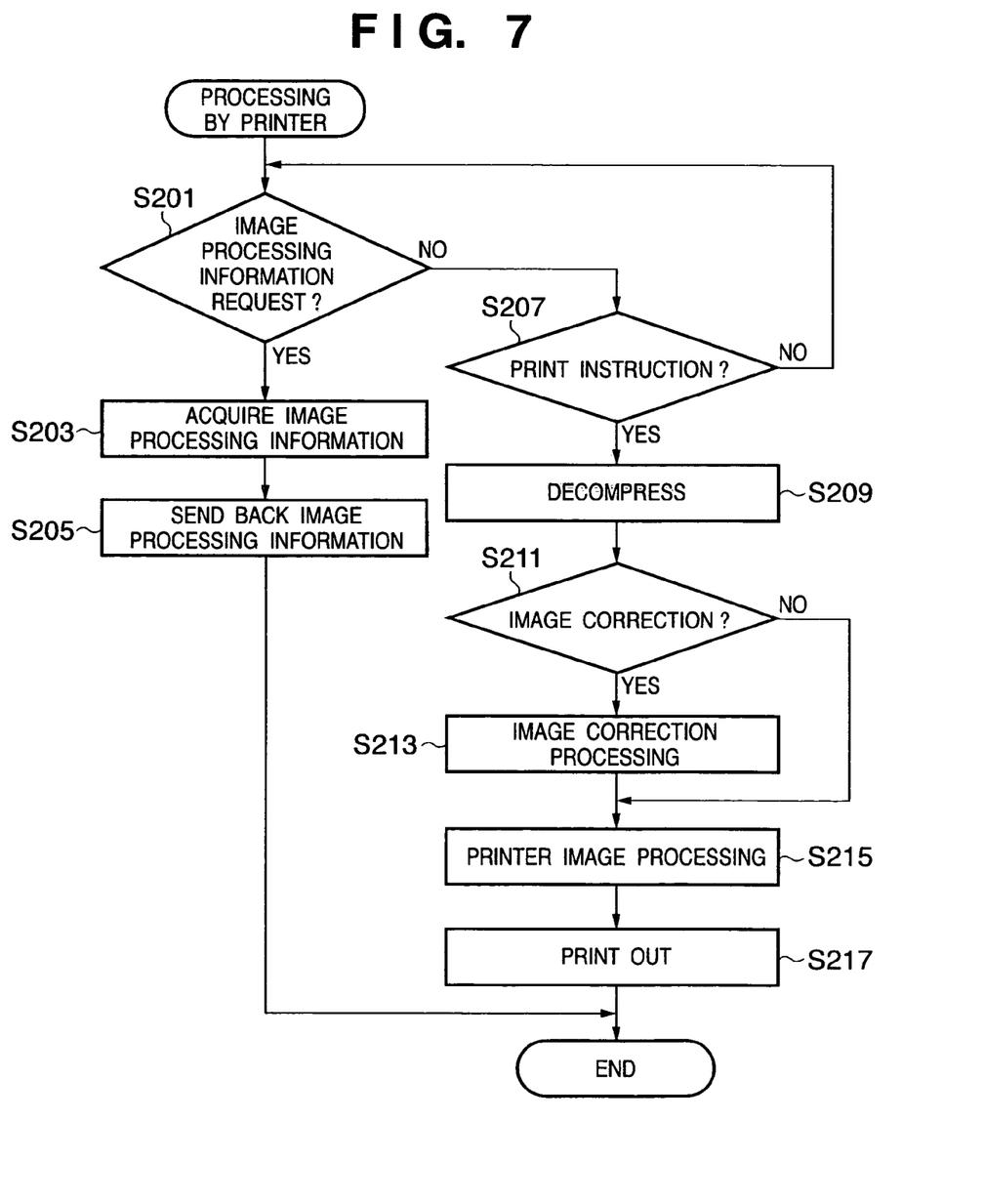
FIG. 7 is a flowchart for explaining operation of the printer according to the first embodiment of the present invention.

The first embodiment will describe processing when the user sets image correction processing in direct printing. FIG. 4 is a view showing an example of an image correction setting dialog displayed in the image sensing apparatus. FIG. 6 is a flowchart for explaining processing by the image sensing apparatus, and FIG. 7 is a flowchart for explaining processing by the printer.

The image correction setting dialog shown in FIG. 4 is displayed on a display unit 115 by the camera system controller 120' in the course of, e.g., print settings. The user selects and sets a desired correction content (e.g., "contrast") and a correction amount (e.g., "high") on the setting dialog. When the user finally designates printing, the camera system controller 120' is notified of the image correction setting contents.

Figure 1:
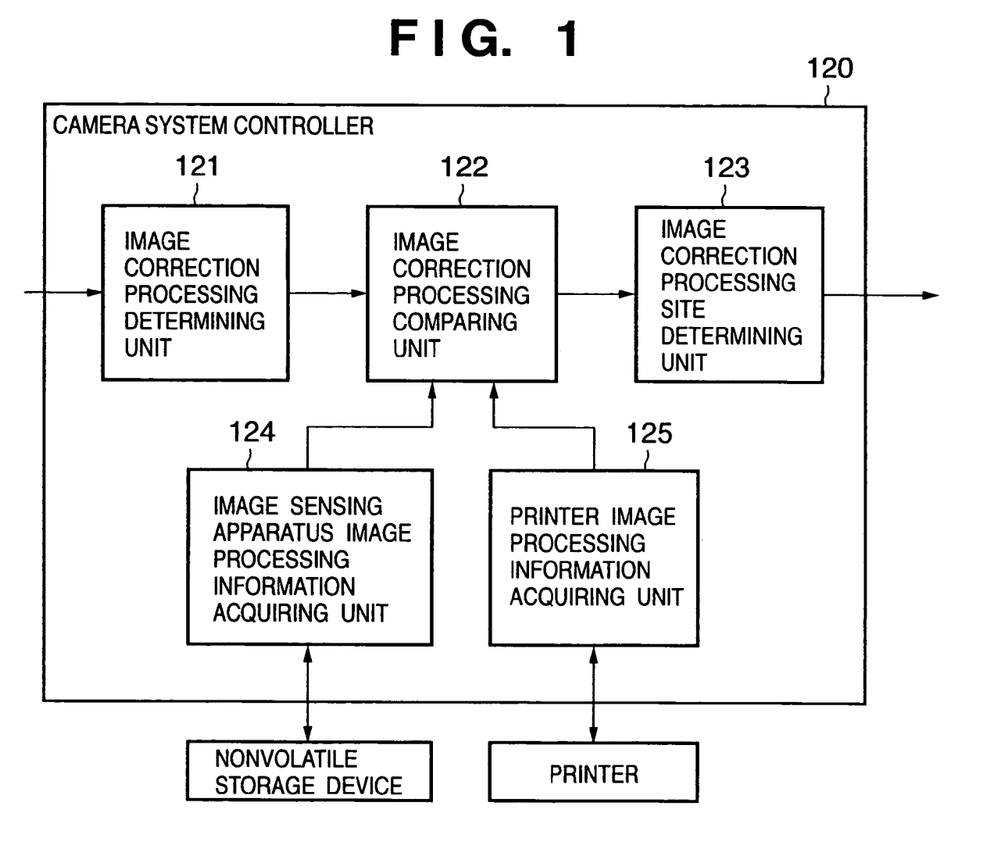
FIG. 1 is a functional block diagram showing an example of the functional arrangement of a camera system controller 120' in an image sensing apparatus according to the first embodiment of the present invention.

FIG. 1 is a functional block diagram for explaining the functional arrangement of the camera system controller 120'. If printing is designated via a user interface 113 (S101), an image correction processing determining unit 121 determines whether image correction has been set (S103). If image correction has been set, the image correction processing determining unit 121 interprets correction contents (e.g., contrast, sharpness, white balance, and color density) and their correction amounts (e.g., auto, high, middle, and low), and transmits the pieces of information to an image correction processing comparing unit 122.

Upon reception of the information on correction, the image correction processing comparing unit 122 uses a printer image processing information acquiring unit 125 to acquire information (image processing information) on the image processing capabilities of a connected printer from the printer system controller 210' via a communication unit (not shown) (S105). The printer image processing information acquiring unit 125 sends to the printer system controller 210', for example, type information for specifying image processing information to be acquired and a command representing an information request. The printer system controller 210' interprets the received command (S201 and S207). If the command is an image processing information request command, the printer system controller 210' reads out the requested information from information stored in, e.g., a nonvolatile storage device (not shown) (S203), and sends back the read-out information (S205).

An image sensing apparatus image processing information acquiring unit 124 acquires corresponding image processing information of the image sensing apparatus from, e.g., a nonvolatile storage device (not shown) (S107).

Figure 10:
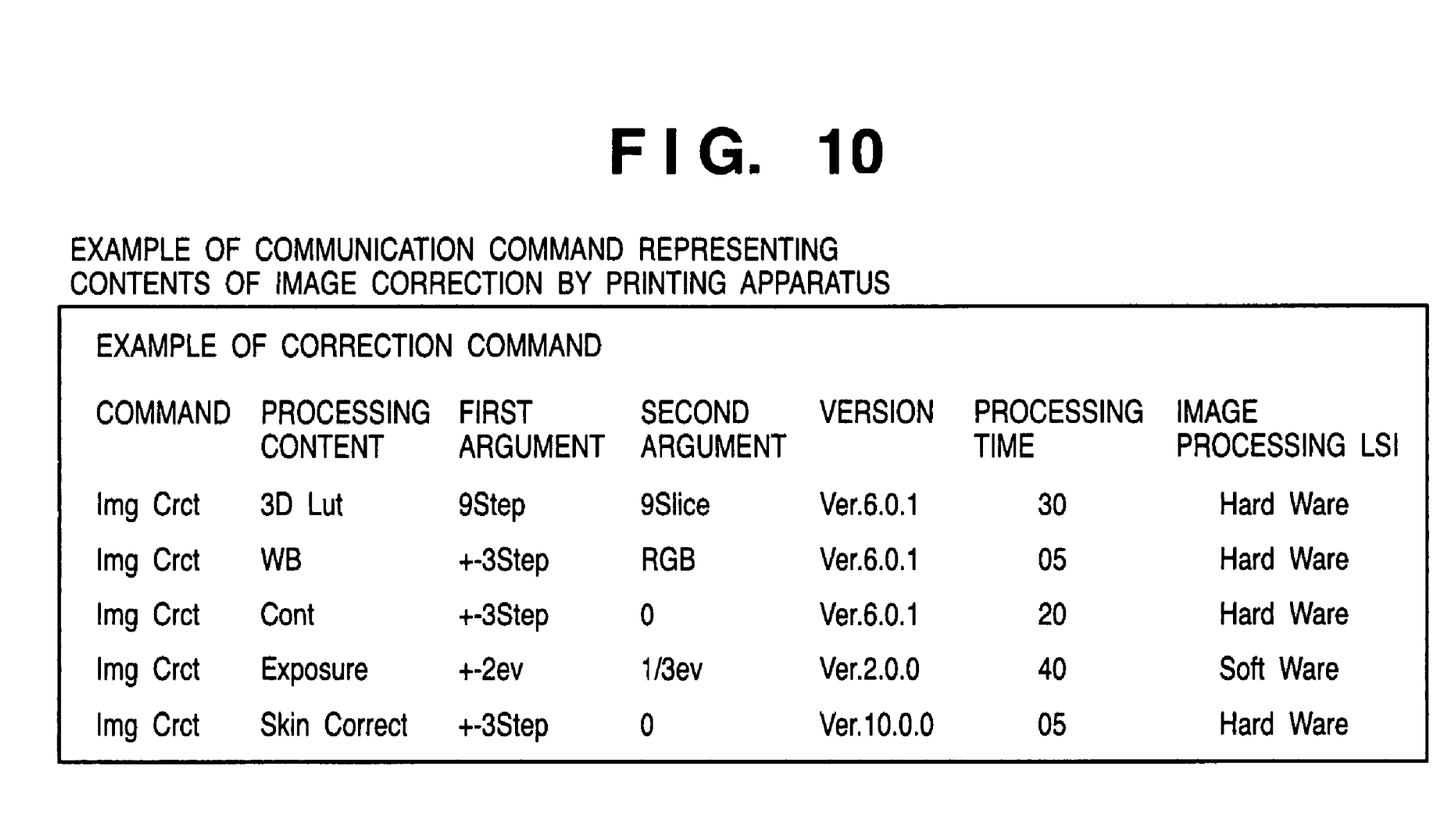
FIG. 10 is a view showing an example of commands transmitted from the printer to the image sensing apparatus according to the first embodiment of the present invention.

FIG. 10 is a view showing an example of commands for transmitting, to the image sensing apparatus, information on the image correction function of the printer according to the communication method shown in FIG. 9. In the first embodiment, the printer transmits, to the image sensing apparatus, the type of image correction, the contents of image correction, the correction version, the correction processing time, information representing which of software and hardware executes image processing, and the like. With these commands, information is transmitted to the image sensing apparatus as a response to "Get Capability" (602) in the above-mentioned communication sequence of FIG. 9.

Image processing information is information for determining which of the printer and image sensing apparatus performs image correction processing designated by the user. The image processing information is arbitrary information which can be used to make a decision. More specifically, the image processing information may be information representing the capabilities of image processing, e.g., information representing the presence/absence of an image correction processing circuit, version information of an image correction software library (set of modules), or version information of each software module for performing each correction such as contrast correction or white balance correction. The image processing information may be information on the processing method (hardware processing or software processing), or information representing a concrete correction capability such as the correction precision or correction range (e.g., the number of grids of a 3D-LUT (Look Up Table)). The image processing information may be a processing time taken for correction processing.

The version exchange method is not particularly limited; for example, the Image Optimize field in a job is expanded by Vender Unique, or the version notification in DPS config is expanded.

The image sensing apparatus must hold information to be compared. Hence, information to be acquired is determined in advance so that the printer image processing information acquiring unit 125 and image sensing apparatus image processing information acquiring unit 124 acquire comparable information. Image processing information acquired by each unit suffices to contain at least one comparable information, and the contents (number of items, type, and the like) of pieces of acquired image processing information need not fully coincide with each other.

When image correction processing which can be executed by only the image sensing apparatus is set, execution by the image sensing apparatus is determined.

Based on these pieces of information, an image correction processing site determining unit 123 determines a site (image sensing apparatus or printer) at which image correction is performed (S111). As the determination method, an apparatus exhibiting a higher version of the processing module (i.e., newer module) may be selected. When the processing times of the image sensing apparatus and printer have a significant difference, a module whose processing time is shorter may be selected. When one of the image sensing apparatus performs hardware processing and the other performs software processing, one which performs hardware processing may be selected (i.e., a higher-speed module may be selected). When the precisions of the image sensing apparatus and printer are compared, one of them that can achieve higher-precision correction may be selected. When the image sensing apparatus and printer do not have any significant difference in image processing capabilities or performance, processing by the printer that does not degrade an image by re-compression may be selected.

In this determination, print settings can also be taken into consideration in addition to designation of whether to perform image correction. When direct printing is set, the number of copies, printout size, print type (standard/index), paper type, print quality (speed-oriented or image quality-oriented), and the like can be set in addition to whether to perform image correction. A site at which image correction is performed can be determined in consideration of at least one of these setting values.

For example, when a setting (e.g., index printing or speed-oriented setting) which is considered to give priority to the processing speed is made, one of the image sensing apparatus and printer that can implement higher-speed processing (e.g., executes hardware processing) even if the version is older can be selected. When a setting (e.g., photo printing paper type) which is considered to give priority to the image quality is made, one of the image sensing apparatus and printer that can have higher processing performance (e.g., higher correction precision or generally, higher version) even if the processing time is longer can be selected.

The camera system controller 120' transmits the contents of correction processing to the printer image correcting unit 220 via the camera image correcting unit 130 and printer system controller 210' on the basis of the results of the correction processing site determining unit.

To perform image correction processing by the image sensing apparatus (NO in S113), a compressed/encoded image stored in the image buffer 111 is decompressed by an image decompressing unit 114, and the decompressed image is sent to the camera image correcting unit 130. Set image correction processing is executed by the camera image correcting unit 130, corrected image data is re-compressed and re-encoded by an image compressing unit 116 (S117), and the re-compressed/re-encoded image data is transmitted from an image transmitting unit 112 to the printer (S119).

To perform image correction by the printer (YES in S113), a compressed/encoded image stored in the image buffer 111 is directly transmitted to the printer via the image transmitting unit 112. The camera system controller 120' notifies the printer system controller 210' of a printer image correction signal representing the correction contents (S115).

In the printer 200, upon reception of a print instruction command, the image data received by an image receiving unit 201 is stored in an image buffer 202, and decompressed by an image decompressing unit 203 (S209). If image correction by the printer is designated by the printer image correction signal (YES in S211), the decompressed image is transmitted to a printer image correcting unit 220. The printer image correcting unit 220 performs image correction complying with the correction contents designated by the printer system controller 210' (S213).

If image correction is designated but it is not image correction by the printer, a printer image processing unit 204 directly receives a decompressed image via the printer image correcting unit 220. The printer image processing unit 204 executes conversion into data suitable for processing by the printing unit, including color space conversion (e.g., conversion from RGB into CMY) (S215). The converted image data is printed out by a printing unit 205 of, e.g., an inkjet type (S217).

The contents and method of image correction performed by the camera image correction processing unit 130 and printer image correction processing unit 220 will be explained. These processes are generally done, and a simple method will be explained.

Contrast can be corrected by a method of correcting the Y (luminance) signal on the basis of an S-curve luminance conversion table in accordance with the correction amount when, for example, image data has the JPEG format.

Brightness can be corrected by applying a gain corresponding to the correction amount to the JPEG Y signal. A conversion method based on the luminance table is also popular.

Color gain can be corrected by applying a fixed gain to the JPEG CrCb (color difference) signal. Hue can be corrected by executing the following rotation operation for the CrCb signal:

$$\begin{pmatrix} Cr' \\ Cb' \end{pmatrix} = \begin{pmatrix} \cos\theta & \sin\theta \\ -\sin\theta & \cos\theta \end{pmatrix} \begin{pmatrix} Cr \\ Cb \end{pmatrix}$$

As for the gray balance, the white point can be corrected by adding an offset to the CrCb signal:

$$\begin{pmatrix} Cr' \\ Cb' \end{pmatrix} = \begin{pmatrix} Cr + \Delta Cr \\ Cb + \Delta Cb \end{pmatrix}$$

Sharpness can be corrected by applying a gain to the result of the bandpass filter of an image, e.g., the result of a (−1 2 −1) digital filter and thereby adding the gain to the original image. Sharpness can be changed by changing the gain value.

As an automatic correction method, known examples of an automatic tone correction method are a method of acquiring the histogram of an image, calculating the ratio of dark and highlight parts of an image, when the ratio is equal to or higher than a predetermined value, performing tone correction, and a method of executing histogram transformation.

As an automatic brightness correction method, the average brightness of the frame is calculated, and the brightness is so corrected as to adjust its value to a predetermined level.

In automatic sharpness correction, the frequency is analyzed, and when high-frequency components reach a predetermined level, they are determined to be noise and are removed by a low-pass filter. To the contrary, when high-frequency components are equal to or lower than a predetermined level, sharpness is enhanced.

According to the first embodiment, when an instruction to perform image correction is issued in printing, image processing information of the printer is acquired. Which of the printer and image sensing apparatus performs processing is automatically determined in accordance with the relationship with image processing information of the image sensing apparatus. Settings capable of obtaining an optimal result can be automatically made without any user's consciousness.

Second Embodiment

In the first embodiment, correction items are presented by the user interface dialog displayed in the image sensing apparatus, and the user can set image correction processing by selecting desired items. In some old-type image sensing apparatuses, however, the setting items and the correction degree of image correction processing are limited. When direct printing is executed by connecting such an image sensing apparatus to the latest printer, image correction items installed in only the printer or the correction degree settable by only the processing module of the printer may exist.

In the first embodiment, image processing information of the printer is acquired on the basis of image correction designated by the image sensing apparatus. The user cannot designate, e.g., image correction processing executable by only the printer.

Even in this case, the second embodiment can optimize role sharing between the image sensing apparatus and printer.

Figure 5:
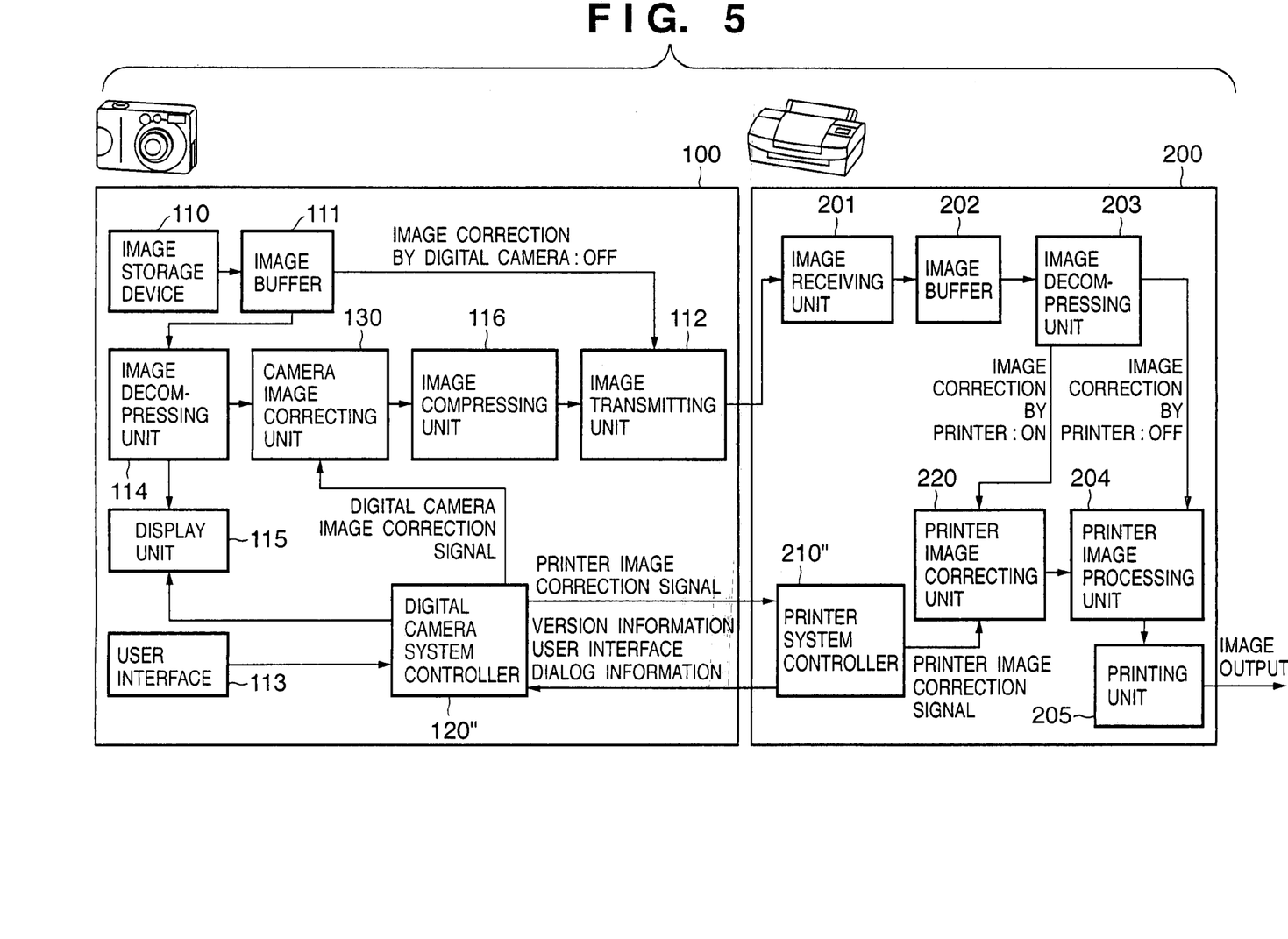
FIG. 5 is a block diagram showing an example of the schematic arrangements of an image sensing apparatus and printer according to the second embodiment of the present invention.

FIG. 5 is a block diagram showing the schematic arrangements of an image sensing apparatus and printer according to the second embodiment of the present invention. The basic arrangement is the same as that in FIG. 2, and the same reference numerals denote the same parts. As is apparent from a comparison between FIGS. 2 and 5, the second embodiment is the same as the first embodiment except operations of a camera system controller 120" and printer system controller 210".

Figure 8:
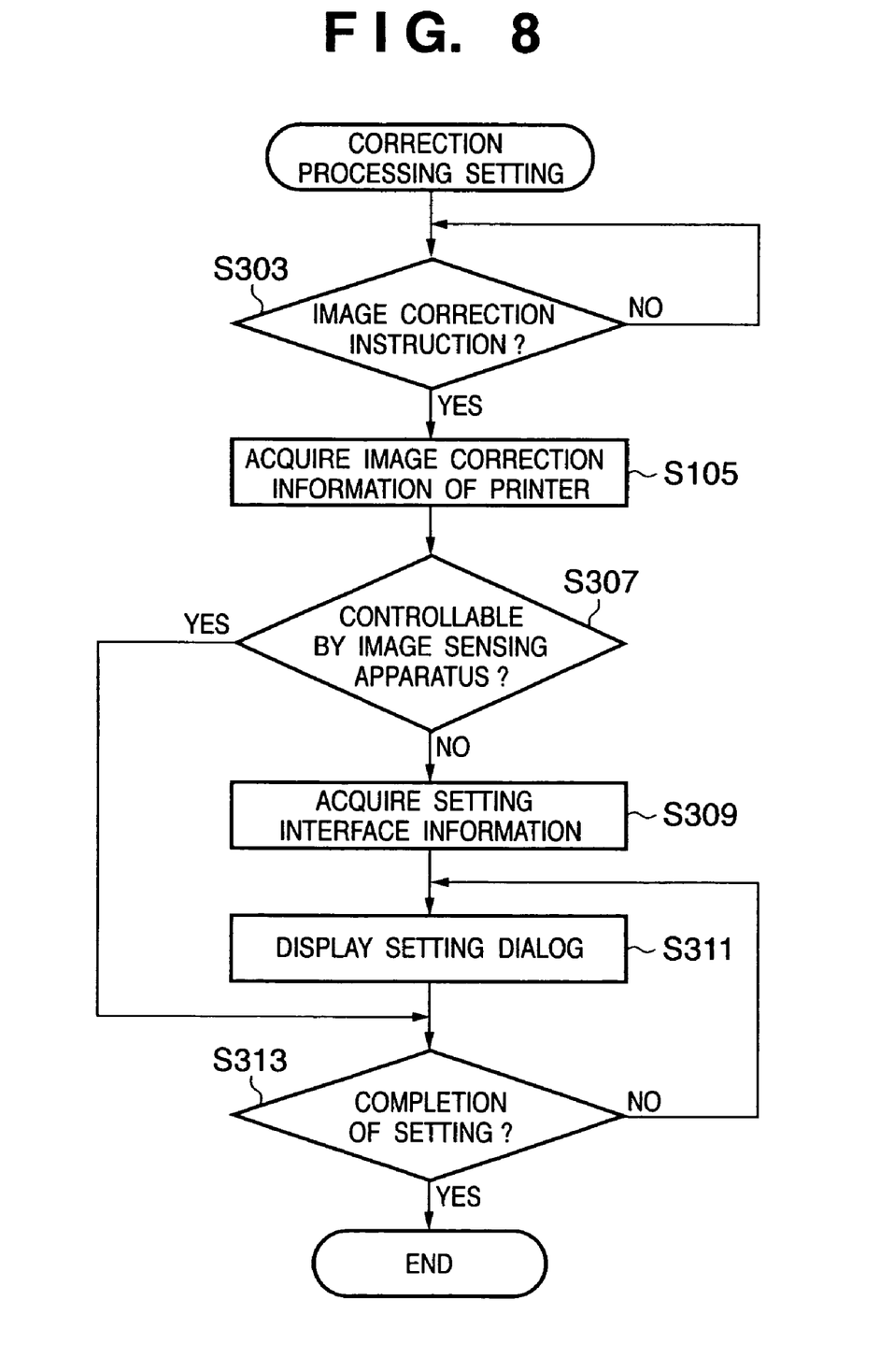
FIG. 8 is a flowchart for explaining operation of the image sensing apparatus according to the second embodiment of the present invention.

FIG. 8 is a flowchart for explaining image correction setting processing executed in the image sensing apparatus according to the second embodiment.

If image correction processing is selected via a user interface 113 (YES in S303), an image correction processing comparing unit 122 of the camera system controller 120" acquires correction processing information from the printer system controller 210" by using a printer image processing information acquiring unit 125 (S105). At this time, unlike the first embodiment, information on all image processes which can be done by the printer is acquired.

By using printer image processing information and image sensing apparatus image processing information acquired by an image sensing apparatus image processing information acquiring unit 124, the image correction processing comparing unit 122 determines whether the setting dialog of the image sensing apparatus can cover image processing which can be implemented by the printer (S307).

As determination items, the setting dialog can present, for example, whether the printer has correction contents other than image correction contents settable by the image sensing apparatus, and whether the number of settable parameters and the settable range (correction degree) are different between the printer and the image sensing apparatus even when correction contents are the same.

If it is determined that settings which fully exploit the processing capabilities of the printer cannot be provided on the setting dialog of the image sensing apparatus owing to the difference in correction contents or correction degree, the image correction processing comparing unit 122 uses the printer image processing information acquiring unit 125 to acquire from the printer system controller 210" a setting dialog or information for displaying the setting dialog. The printer system controller 210" also transmits information which constructs a user interface (UI) in the image sensing apparatus so as to cover a correction range settable by the printer. For example, assume that the camera image correcting unit 130 can correct the brightness within the range of ±2 (EV), and a printer image correcting unit 220 can correct it within the range of ±3 (EV).

At this time, the image sensing apparatus generally has only information for displaying a UI for a setting range of ±2, and the user cannot set +3 or −3. To avoid this, information for displaying a UI (setting dialog) for a setting range of ±3 in the image sensing apparatus is transmitted from the printer to the image sensing apparatus. The camera UI can be constructed so that a range processible by only the printer can be set in the image sensing apparatus.

In this manner, the image sensing apparatus displays the setting dialog on the display by using the setting dialog display information acquired from the printer (S311). The camera constructs a UI on the basis of the received UI information, and displays a dialog for accepting print settings.

A setting dialog or setting dialog display information acquired from the printer (transmitted by the printer system controller 210") can adopt any format such as a combination of a markup language (e.g., HTML or XML) and a script language as far as information of this format can be interpreted by the image sensing apparatus. The user can set execution of desired image correction processing by using the displayed setting dialog. The image sensing apparatus waits for a setting completion instruction, and ends setting upon receiving the instruction (YES in S313).

When a print instruction containing the set image correction instruction is issued, the basic processing may be common to the processing described in the first embodiment. If, however, set image correction exhibits correction contents or a correction degree executable by only the printer, execution by the printer is determined in execution site determination processing of S111; otherwise (i.e., image correction processing is set which has correction contents and a correction degree executable by both the image sensing apparatus and printer), determination processing described in the first embodiment is done.

Processing by the printer according to the second embodiment is common to processing described in the first embodiment except that the processing of the second embodiment additionally includes processing of interpreting an interface information request command as a command and processing of, when an interface information request command is received, reading out setting dialog data or setting dialog display data stored in advance from, e.g., a nonvolatile memory and sending back the data to the image sensing apparatus in order to set image processing executable by the printer image correcting unit 220.

According to the second embodiment, in addition to the effects realized by the first embodiment, even when there are correction contents and a correction range processible by only the printer, image correction processing having these contents and range can be set from the image sensing apparatus.

Other Embodiment

The present invention has been described in detail on the basis of preferred embodiments. However, the present invention is not limited to the specific embodiments, and various design changes can be made without departing from the spirit and scope of the invention. These changes are also contained in the present invention.

The present invention also includes a case in which a software program for implementing the functions of the above-described embodiments is supplied directly from a recording medium or via wire/radio communication to a system or apparatus having a computer capable of executing the program, and the computer of the system or apparatus executes the supplied program to achieve equivalent functions.

The present invention is therefore implemented by program codes installed in the computer in order to implement functional processing of the present invention by the computer. That is, the present invention includes a computer program for implementing functional processing of the present invention.

In this case, the present invention can take any program form such as an object code, a program executed by an interpreter, or script data supplied to an OS as far as a program function is attained.

A recording medium for supplying the program includes a magnetic recording medium (e.g., flexible disk, hard disk, or magnetic tape), an optical/magnetooptical recording medium (e.g., MO, CD-ROM, CD-R, CD-RW, DVD-ROM, DVD-R, or DVD-RW), and a nonvolatile semiconductor memory.

As a program supply method using wire/radio communication, a server on a computer network stores a data file (program data file) serving as a computer program which implements the present invention in a client computer, such as a computer program itself which implements the present invention, or a compressed file containing an automatic install function. The program data file is downloaded into a connected client-computer. In this case, the program data file can be divided into a plurality of segment files, and these segment files can be distributed in different servers.

In other words, the present invention also includes a server apparatus which prompts a plurality of users to download the program data file for implementing functional processing of the present invention by a computer.

The program of the present invention can also be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are implemented when the computer executes the readout program. Also, the functions of the above-described embodiments are implemented when an OS or the like running on the computer performs some or all of actual processes on the basis of the instructions of the program.

Furthermore, after the program read out from the storage medium is written in the memory of a function expansion board inserted into the computer or the memory of a function expansion unit connected to the computer, the CPU of the function expansion board or function expansion unit performs some or all of actual processes on the basis of the instructions of the program, and thereby implements the functions of the above-described embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Applications No. 2004-194293 filed on Jun. 30, 2004 and No. 2005-187845 filed on Jun. 28, 2005, which are hereby incorporated by reference herein.

What is claimed is:

1. An image sensing apparatus configured to directly instruct a printing apparatus to print image data stored in a storage medium, comprising:
an image processing unit, configured to execute predetermined image processing for the image data to be printed;
an information acquiring unit configured to acquire information on a capability of image processing executable by the connected printing apparatus; and
a determination unit configured to determine which of the image sensing apparatus and the printing apparatus is to perform set image processing, when execution of image processing is set for image data to be printed, said determination being made on the basis of information representing a capability of said image processing unit and information on the capability of the image processing executable by the printing apparatus,
wherein the information representing the capability of said image processing unit and the information on the capability of the image processing executable by the printing apparatus contain, respectively:
information representing a version of a module which performs image processing, and information representing whether the module performs the image processing by software or hardware, and
wherein said determination unit determines processing by one of the image sensing apparatus and the printing apparatus that has a said module exhibiting a newer version as a default, and determines, if a predetermined setting has been set, processing by one of the image sensing apparatus and the printing apparatus that has its said module performing the image processing by hardware even if the version of that module is older than the version of the other said module performing the image processing by software.

2. The apparatus according to claim 1, characterized in that when said determining means determines that the image sensing apparatus is to perform the set image processing, the image data to be printed undergoes the image processing by using said image processing means, and then is output to the printing apparatus.

3. The apparatus according to claim 1, characterized in that when said determining means determines that the printing apparatus is to perform the set image processing, the image data to be printed and information representing the set image processing are output to the printing apparatus.

4. The apparatus according to claim 1, characterized in that said determining means performs the determination in consideration of a content of a print setting.

5. The apparatus according to claim 1, wherein the information representing the capability of said image processing executable by the printing apparatus contains information representing a processing precision of a module which performs image processing, and said determination unit determines processing by one of the image sensing apparatus and the printing apparatus that has a module exhibiting a higher processing precision.

6. The apparatus according to claim 1, further comprising:
a storage unit configured to store information representing a capability of the image processing unit,
wherein said determination unit compares the capability of the image processing unit acquired from said storage unit with the capability of the image processing executable by the printing apparatus acquired from the printer by said information acquiring unit, and determines which of the image sensing apparatus and the printing apparatus is to perform the set image processing.

7. The apparatus according to claim 1, further comprising:
a transmission unit configured to transmit the image data to the printing apparatus, and wherein:
in case that said determining unit determines that the image sensing apparatus is to perform the set image processing, said transmission unit transmits the image data to be printed, after it undergoes the set image processing by said image processing unit, to the printing apparatus; and in case that said determining unit determines that the printing apparatus is to perform the set image processing, the transmission unit transmits the image data to be printed and information representing the set image processing to the printing apparatus.

8. The apparatus according to claim 1, further comprising a setting unit configured to allow a user to set an image processing to be applied to the image to be printed.

9. The apparatus according to claim 1, wherein the set image processing includes at least one of a contrast correction, a sharpness correction, a white balance correction, and a color density correction.

10. The apparatus according to claim 1, wherein said predetermined setting is an index printing setting.

11. The apparatus according to claim 1, wherein said predetermined setting is a speed-oriented printing setting.

* * * * *